United States Patent
Winter

(10) Patent No.: US 6,436,330 B1
(45) Date of Patent: Aug. 20, 2002

(54) PROCESS AND APPARATUS FOR THE PRODUCTION OF LABELED PLASTIC BOTTLES

(75) Inventor: Horst Winter, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 09/424,404

(22) PCT Filed: Apr. 29, 1999

(86) PCT No.: PCT/EP99/02898

§ 371 (c)(1),
(2), (4) Date: Nov. 22, 1999

(87) PCT Pub. No.: WO99/57018

PCT Pub. Date: Nov. 11, 1999

(30) Foreign Application Priority Data

May 2, 1998 (DE) .......................................... 198 19 731

(51) Int. Cl.⁷ ............................................. B29C 49/28
(52) U.S. Cl. ........................ 264/509; 264/230; 425/500; 425/522; 156/521; 156/566; 156/567; 156/86
(58) Field of Search ................................ 425/522, 500; 264/509, 230; 156/86, 521, 566, 567, 568

(56) References Cited

U.S. PATENT DOCUMENTS

| | | | | |
|---|---|---|---|---|
| 4,102,728 A | * | 7/1978 | Smith | 156/362 |
| 4,225,375 A | * | 9/1980 | Aidlin et al. | 156/242 |
| 4,447,280 A | * | 5/1984 | Malthouse | 156/85 |
| 4,911,772 A | * | 3/1990 | Hoffmann | 156/86 |
| 4,983,349 A | * | 1/1991 | Krall et al. | 264/509 |
| 5,403,416 A | * | 4/1995 | Bright et al. | 156/86 |
| 6,152,723 A | | 11/2000 | Winter et al. | 425/526 |

FOREIGN PATENT DOCUMENTS

| | | |
|---|---|---|
| DE | 1704022 | 1/1971 |
| DE | 2621993 | 12/1977 |
| DE | 3837118 | 5/1990 |
| DE | 29720311 | 3/1998 |
| EP | 0 284242 | 9/1988 |
| EP | 0 597385 | 5/1994 |
| FR | 2558104 | 7/1985 |
| WO | WO 95/27613 | 10/1995 |

* cited by examiner

Primary Examiner—Jan H. Silbaugh
Assistant Examiner—Joseph S. Del Sole
(74) Attorney, Agent, or Firm—Marshall, Gerstein & Borun

(57) ABSTRACT

A process and an apparatus for the production of labeled plastic bottles, to produce labeled bottles at a high output rate and with a reliable label hold wherein the bottles are labeled in a continuous flow directly after leaving the blowing machine. The bottles are still clean and dry, and allow for a reliable attachment of the labels at a high rate.

12 Claims, 2 Drawing Sheets

PROCESS AND APPARATUS FOR THE PRODUCTION OF LABELED PLASTIC BOTTLES

FIELD OF THE INVENTION

The invention pertains to a process and an apparatus for the production of labeled plastic bottles.

BACKGROUND OF THE INVENTION

In the production of labeled plastic bottles it is known (DE-AS 17 04 022), to first continuously produce plastic bottles from blanks in a blowing machine. Blowing machines of this kind take the preheated blanks, also called preforms, into specially designed blow molds, in which they are blown into bottles at high pressure and high temperature during the rotation of the blowing machine. At the outlet of the blowing machine the bottles are then passed on to an output star wheel.

In this method known in the art, the bottles, once ready, are passed on from the output star wheel to a filling machine, which operates in a rotary manner as well. There the bottles are filled with the desired liquid. Then the bottles are capped by a bottle capping machine and passed on to a labeling machine. The disadvantage of this system is that it is not always possible to ensure that the outside surface of the bottle, which will be labeled, stays dry and clean during the filling and capping procedure, which is an essential precondition for reliable labeling.

It has also been proposed (DE-OS 26 21 993) to pass on the bottles from a blowing machine to a carousel in a clocked manner, and to perform different treatment steps intermittently in this carousel, that is to say first a testing procedure, then the labeling, then the printing, then the filling and then finally the capping and the packaging. The disadvantage here is that this clocked operation does not allow for high output rates.

SUMMARY OF THE INVENTION

It is the task of the invention to provide a process and an apparatus, by means of which labeled plastic bottles can be produced at high capacity and with a nonetheless reliable label hold.

In the process according to the invention, the plastic preforms, after having been continuously created in a blowing machine, preferably in a rotary blowing machine, are then continuously labeled without the interposition of any further treatment steps and directly afterwards, i.e. downstream from the blowing machine, whereby only the pitch distance has to be adjusted to the distance required for labeling, if necessary. The advantage of this is that by means of the immediately consecutive arrangement of the blowing and labeling procedure it can be ensured that the bottles, leaving the blowing machine absolutely dry and clean, are labeled directly afterwards, so that the label can be attached reliably on a clean surface. The continuous operation, as opposed to a clocked operation, allows for substantially greater bottle output per hour, and consequently for a greater capacity of the system.

In an advantageous embodiment of the process, the bottles, after leaving the blowing machine, are passed on to an output star wheel, where they are set at the pitch distance required for labeling. Preferably, to implement this step, an output star wheel is used which has controllable gripper arms for the bottles which allow for modifying the distance between the consecutive bottles. Such transporter stars are known in the art (for example DE-OS 3837 118, to which express reference is made here). Despite continuous operation, such proceeding saves a lot of space and provides for an efficient blocking of the blowing and labeling machine, since the output star wheel can at the same time be used as the input star wheel for the downstream labeling machine.

An output star wheel without pitch distance control, however, can also be used. In this case, a downstream distancing worm screw can be used, if necessary.

More than ever, the advantages of the invention become noticeable when a label preformed as a sleeve has to be pulled over the bottles in the labeling machine. A heat shrinking tubular foil or a stretch foil is usually used for these so-called sleeve labels, from which foil sleeve shaped sections are prepared. The sleeve diameter is selected to be only slightly wider then the diameter of the bottle in the area, where the label will be attached. If the bottle is clean and dry, there are no problems with adhesion of the foil in moist spots or similar during the pulling process, rather, the sleeve label can be attached very easily and troublefree. Afterwards the label is fixed to the bottle by exposure to heat or mechanical shrinking due to earlier stretching.

It is also possible to utilize the invention in conjunction with a labeling unit which attaches labels to bottles in a traditional way, for example by gluing the whole surface or part of it.

BRIEF DESCRIPTION OF THE DRAWINGS

The invention shall be explained further by means of the figures below. The figures show.

DESCRIPTION OF THE PREFERRED EMBODIMENT

Figure 1:
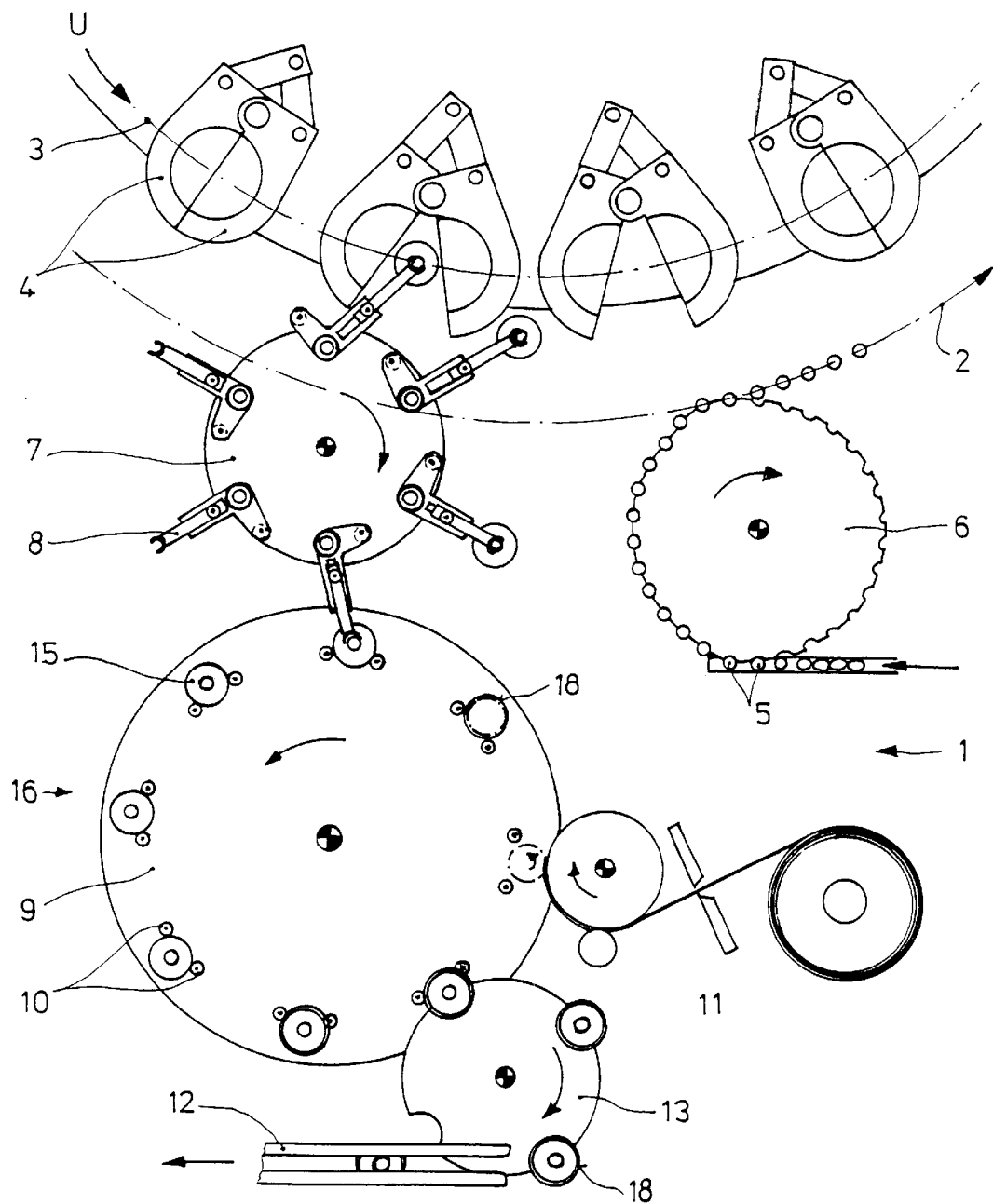
FIG. 1 is the top view of a first exemplified embodiment of an apparatus according to the invention.

In FIG. 1, the apparatus according to the invention for the production of labeled plastic bottles 15 is indicated collectively as 1. The apparatus 1 includes a blowing machine for the production of plastic bottles 15, which is constructed in the form of a carousel and rotates around the vertical axis A. The blowing machine includes a heating wheel 2 at the top (shown only partially), to which the blanks or preforms 5 are brought in by means of an input star wheel 6. By means of a transfer device not specified here in more detail, the preforms, preheated to the required blowing temperature in the heating wheel 2, are then passed on to the blowing wheel 3 arranged below, in which the appropriate molds for the production of plastic bottles are arranged by means of opening and closing clamps 4. During a continuous rotation of the blowing wheel 3 in the direction U, plastic bottles 15 are produced from preforms 5. A blowing machine of this kind with the heating wheel at the top and the blowing wheel arranged concentrically below is known from DE-GM 297 20 311.

After the clamps 4 open, the plastic bottles 15 produced in the blowing wheel 3 are taken over by an output star wheel 7 continuously rotating in the direction of the arrow. The output star wheel 7 has controllable gripper arms 8, which are, in addition, able to pivot in the direction of the rotation, i.e. are able to create an additional velocity component in the direction of the rotation, and are further arranged in a radially movable manner, so that the bottle position can be modified in the radial direction as well. By means of such output star wheel 7, the bottles 15 taken from the blowing wheel 3 can be set at the pitch distance required for the labeling machine 16 arranged downstream.

The labeling machine 16, as arranged downstream to the output star wheel 7, includes a rotary table 9, on which rotary rolls 10 are arranged in pairs, to which the bottles 15 are passed on. In the area of the rotary table 9, a labeling unit 10 is arranged, which attaches sleeves 18 (label sleeves made of heat shrinking plastic foil) to the bottles 15 in a manner known in the art. A labeling machine of this kind is specified in WO-OS 95/27613, to which express reference is made here. The bottles 15, labeled directly downstream from the blowing machine, are passed on by means of an output star wheel 13 into a transport route, for example a suspended conveyor, as it is indicated by 12 in FIG. 1. From there, they are passed on, for example, to a filling machine.

In this exemplified embodiment, as has been specified, the output star wheel of the blowing machine has gripper arms 8 controllable in such a manner that it is able to set the bottles 15 at the pitch distance required for the labeling machine 16 arranged downstream. The output star wheel 7 is thus at the same time used as the input star wheel for the labeling machine 16. This compact construction allows, in a very advantageous manner, for the bottles 15, produced in the blowing wheel 3, to be clean and dry at the labeling procedure occurring in a continuous flow and directly downstream, which facilitates the labeling procedure in the labeling unit and provides for a troublefree labeling. The compact construction reduces the instrumentational expenditure and allows for the labeling to occur in a continuous flow, which eliminates the need for an intermediate storage of the bottles behind the blowing wheel. The continuous mode of operation allows for a high output.

Figure 2:
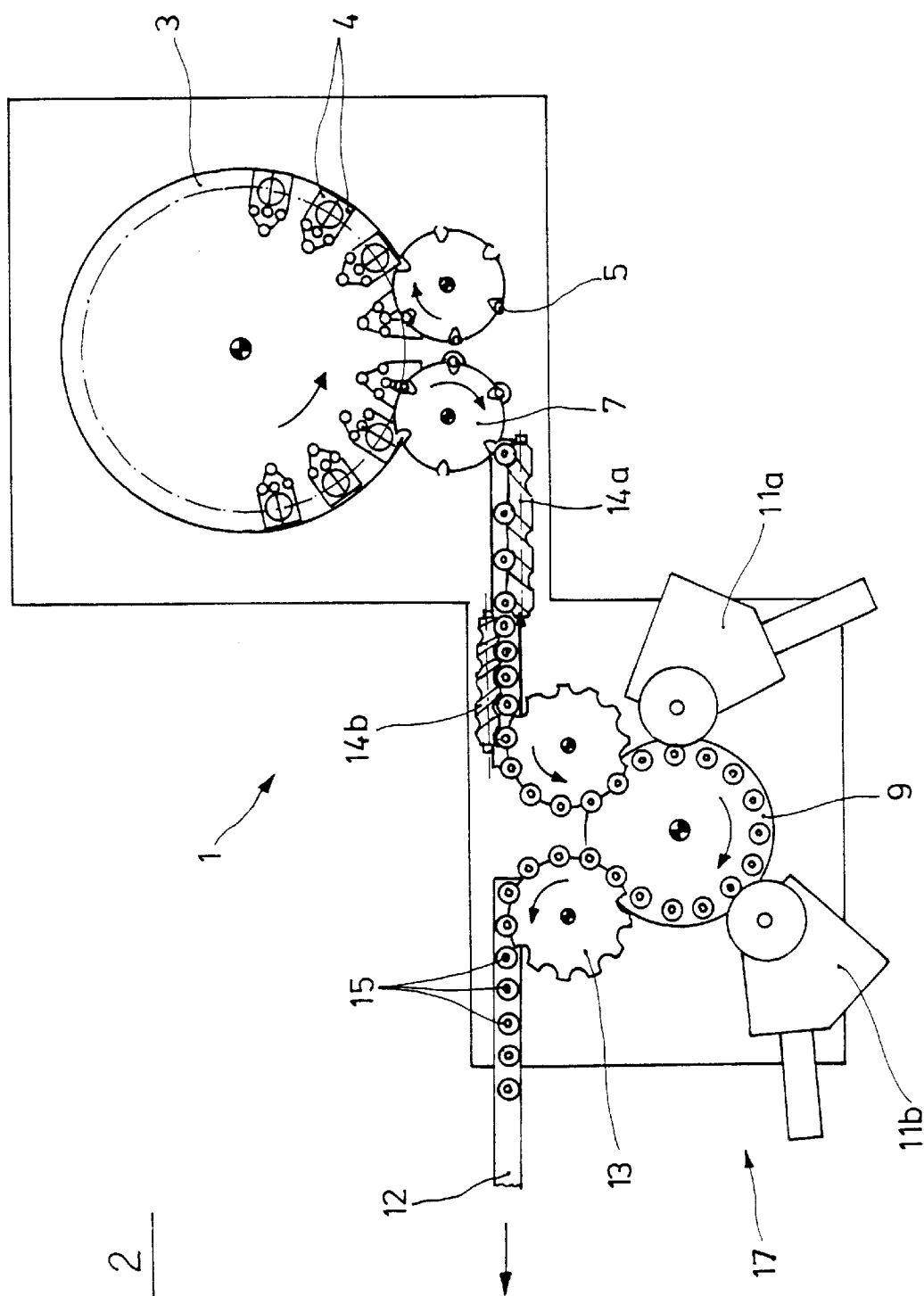
FIG. 2 is the top view of a second exemplified embodiment according to the invention in a schematic view.

The same advantages are also achieved by means of the machine shown in FIG. 2, in which parts with the same function are indicated with the same reference numbers as in FIG. 1. The blowing machine has the same construction as in FIG. 1. Only the blowing wheel 3 arranged at the bottom is shown. The difference between this exemplified embodiment of FIG. 2 and the one shown in FIG. 1 is that here the output star wheel 7, to which the bottles are passed on after leaving the blowing wheel 3, operates without controllable gripper arms, thus having a simpler construction, but passing the bottles on to two distancing worm screws 14a, 14b, which then set the bottles 15 at the pitch distance required for the labeling machine 17 arranged downstream. The labeling machine comprises two labeling units 11a, 11b, one of which is, for example, used to attach the body label and the other the neck label. The construction and mode of operation of such machine is known in the art and does not require further explanation. In this solution, a traditional labeling machine is blocked directly to the blowing machine, and the pitch distance of the bottles is set by means of at least one distancing worm screw. Here, too, the bottles are still clean and dry when they are being labeled, which facilitates the labeling. Here, too, the operation is continuous, which allows for a high output.

I claim:

1. A process for the production of labeled plastic bottles comprising the steps of:

a) continuously producing bottles from plastic preforms in a blowing machine;

b) adjusting a pitch distance for the bottles by a conveying section to a distance required for labeling, said conveying section continuously delivering the bottles which are clean and dry from the blowing machine to a labeling machine; and c) labeling the clean and dry bottles in a continuous flow directly after producing the bottles without the interposition of any further treatment steps.

2. The process according to claim 1, further comprising the step of passing the bottles from the outlet of the blowing machine on to an output star wheel.

3. The process according to claim 2, further comprising the step of setting the pitch distance for the bottles utilizing the output star wheel as required for a particular labeling process.

4. The process according to claim 1 or 2, further comprising the step of simultaneously using the output star wheel as an input star wheel for passing on the bottles to the labeling machine.

5. The process according to claim 1, 2, or 3, further comprising the step of installing a preformed sleeve-shaped label on the bottles in the labeling machine.

6. A process according to claim 1, wherein said blowing machine is a rotary blowing machine.

7. An apparatus for the production of labeled plastic bottles, comprising in combination: a blowing machine (2, 3) for producing clean and dry bottles from plastic blanks (5) in a continuous flow; a labeling machine arranged directly downstream to said blowing machine (2, 3) whereby the clean and dry bottles (15) are labeled in a continuous flow directly after leaving said blowing machine without the interposition of any further treatment steps; and a conveying section for both continuously transferring bottles from the blowing machine to the labeling machine and adjusting a pitch distance for the bottles to a distance required for labeling.

8. An apparatus according to claim 7 further comprising an output star wheel (7) as at least part of said conveying section arranged at an outlet of said blowing machine.

9. An apparatus according to claim 8, wherein said output star wheel (7) serves at the same time as an input star wheel for said labeling machine and is arranged generally between said blowing machine and said labeling machine.

10. An apparatus according to claim 9, wherein said output star wheel (7) is equipped with gripping arms (8) controllable to adjust said pitch distance between successive bottles.

11. An apparatus according to claim 7 or 8, further comprising a distancing worm screw (14) as part of said conveying section arranged downstream to said blowing machine, said distancing worm screw setting the distance between the bottles to the pitch distance required for said labeling machine (16, 17) arranged downstream.

12. An apparatus according to claim 7, 8, 9 or 10, wherein said labeling machine (17) includes a unit (11) for winding up labels arranged at the perimeter of a rotary table (9).

* * * * *